US009920659B2

United States Patent
Ahmed et al.

(10) Patent No.: US 9,920,659 B2
(45) Date of Patent: Mar. 20, 2018

(54) COUPLING PIN ANTI-ROTATION FOR A SWITCHABLE ROLLER FINGER FOLLOWER

(71) Applicant: Schaeffler Technologies AG & Co. KG, Herzogenaurach (DE)

(72) Inventors: Faheem Ahmed, Troy, MI (US); Colin Foster, Belle River (CA)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 147 days.

(21) Appl. No.: 15/146,943

(22) Filed: May 5, 2016

(65) Prior Publication Data

US 2017/0321574 A1 Nov. 9, 2017

(51) Int. Cl.
  *F01L 1/14* (2006.01)
  *F01L 1/18* (2006.01)
  *F16H 53/06* (2006.01)

(52) U.S. Cl.
  CPC .............. *F01L 1/18* (2013.01); *F16H 53/06* (2013.01); *F01L 2001/186* (2013.01)

(58) Field of Classification Search
  CPC ........ F01L 1/18; F01L 2001/186; F16H 53/06
  See application file for complete search history.

(56) References Cited

U.S. PATENT DOCUMENTS

| 7,673,601 B2 | 3/2010 | Spath et al. |
| 7,673,606 B2 * | 3/2010 | Ng .............................. F01L 1/18 123/90.16 |
| 2011/0226208 A1 | 9/2011 | Zurface et al. |

* cited by examiner

*Primary Examiner* — Zelalem Eshete
(74) *Attorney, Agent, or Firm* — Volpe and Koenig, P.C.

(57) ABSTRACT

A coupling pin anti-rotation arrangement is provided for a switchable roller finger follower within a valve train of an internal combustion engine. The coupling pin, located on one of the levers, has a first locking surface, and includes at least one coupling pin-side anti-rotation flat; the other lever, with a second locking surface, is configured with at least one lever-side anti-rotation flat. The at least one lever-side anti-rotation flat slidably guides the at least one coupling pin-side anti-rotation flat such that the first locking surface is aligned with the second locking surface throughout longitudinal displacement of the coupling pin within a coupling pin bore. The coupling pin anti-rotation arrangement is adaptable to various switchable roller finger follower designs that incorporate different valve lift strategies and lever configurations.

17 Claims, 8 Drawing Sheets

COUPLING PIN ANTI-ROTATION FOR A SWITCHABLE ROLLER FINGER FOLLOWER

BACKGROUND

The present disclosure relates to a switchable roller finger follower for a valve train of an internal combustion (IC) engine, and more particularly, to the coupling pin of a switchable roller finger follower (SRFF) that provides at least two discrete valve lift modes.

More stringent fuel economy regulations in the transportation industry have prompted the need for improved efficiency of the IC engine. Light-weighting, friction reduction, thermal management, variable valve timing and a diverse array of variable valve lift technologies are all part of the technology toolbox for IC engine designers.

Variable valve lift (VVL) systems typically employ a technology in a valve train of an IC engine that allows different engine valve lifts to occur. The valve train is formed of the components that are required to actuate an engine valve, including a camshaft (also termed "cam"), the valve, and all components that lie in between. VVL systems are typically divided into two categories: continuous variable and discrete variable. Continuous variable valve lift systems are capable of varying a valve lift from a design lift minimum to a design lift maximum to achieve any of several lift heights. Discrete variable valve lift systems are capable of switching between two or more distinct valve lifts. Components that enable these different valve lift modes are often called switchable valve train components. Typical two-step discrete valve lift systems switch between a full valve lift mode and a partial valve lift mode, often termed cam profile switching, or between a full valve lift mode and a no valve lift mode that facilitates deactivation of the valve. Three-step discrete valve lift systems can combine valve deactivation and cam profile switching strategies. Valve deactivation can be applied in different ways. In the case of a four-valve-per-cylinder configuration (two intake+two exhaust), one of two intake valves can be deactivated. Deactivating only one of the two intake valves can provide for an increased swirl condition that enhances combustion of the air-fuel mixture. In another scenario, all of the intake and exhaust valves are deactivated for a selected cylinder which facilitates cylinder deactivation. On most engines, cylinder deactivation is applied to a fixed set of cylinders, when lightly loaded at steady-state speeds, to achieve the fuel economy of a smaller displacement engine. A lightly loaded engine running with a reduced amount of active cylinders requires a higher intake manifold pressure, and, thus, a greater throttle plate opening, than an engine running with all of its cylinders in the active state. Given the lower intake restriction, throttling losses are reduced in the cylinder deactivation mode and the engine runs with greater efficiency. For those engines that deactivate half of the cylinders, it is typical in the engine industry to deactivate every other cylinder in the firing order to ensure smoothness of engine operation while in this mode. Deactivation also includes shutting off the fuel to the dormant cylinders. Reactivation of dormant cylinders occurs when the driver demands more power for acceleration. The smooth transition between normal and partial engine operation is achieved by controlling ignition timing, cam timing and throttle position, as managed by the engine control unit (ECU). Examples of switchable valve train components that serve as cylinder deactivation facilitators include roller finger followers, roller lifters, pivot elements, rocker arms and camshafts; each of these components is able to switch from a full valve lift mode to a no valve lift mode. The switching of lifts occurs on the base circle or non-lift portion of the camshaft; therefore the time to switch from one mode to another is limited by the time that the camshaft is rotating through its base circle portion; more time for switching is available at lower engine speeds and less time is available at higher engine speeds. Maximum switching engine speeds are defined by whether there is enough time available on the base circle portion to fully actuate a coupling assembly to achieve the desired lift mode.

In today's IC engines, many of the switchable valve train components that enable valve deactivation for cylinder deactivation contain a coupling or locking assembly that is actuated by an electro-hydraulic system. The electro-hydraulic system typically contains at least one solenoid valve within an array of oil galleries that manages engine oil pressure to either lock or unlock the coupling assembly within the switchable valve train component to enable a valve lift switching event. These types of electro-hydraulic systems require time within the combustion cycle to actuate the switchable valve train component.

In most IC engine applications, switchable valve train components for cylinder deactivation in an electro-hydraulic system are classified as "pressure-less-locked", which equates to:

a). In a no or low oil pressure condition, the spring-biased coupling assembly will be in a locked position, facilitating the function of a standard valve train component that translates rotary camshaft motion to linear valve motion; and, b). In a condition in which engine oil pressure is delivered to the coupling assembly that exceeds the force of the coupling assembly bias spring, the coupling assembly will be displaced by a given stroke to an unlocked position, facilitating valve deactivation where the rotary camshaft motion is not translated to the valve.

"Pressure-less-unlocked" electro-hydraulic systems can be found in some cam profile switching systems that switch between a full valve lift and a partial valve lift, which equates to:

a). In a no or low oil pressure condition, the spring-biased coupling assembly will be in an unlocked position, facilitating a partial valve lift event; and, b). In a condition in which engine oil pressure is delivered to the coupling assembly that exceeds the force of the coupling assembly bias spring, the coupling assembly will be displaced a given stroke to a locked position, facilitating a full valve lift event.

Vital to the durability and performance of a switchable valve train component is the robustness of the coupling assembly. Two important design attributes of the coupling assembly include: 1). the ability to switch from a locked to an unlocked position very quickly, and 2). a high resistance to wear. However, many times these attributes are in opposition. For example, the locking/unlocking stroke of the coupling assembly to engage/disengage an adjacent component has a direct impact on switching times; a shorter stroke for a given cross-sectional area of a coupling assembly will likely yield a faster switching time. Yet, a shorter stroke typically dictates a smaller contact area with the engaged or disengaged component, meaning that a given load is applied over a smaller area leading to higher contact pressures and subsequent wear. For this reason, various coupling assembly forms, materials, coatings and heat treatments are often employed in an effort to maximize wear resistance in order to minimize the actuation stroke and resultant contact area.

Many coupling assembly designs utilize a coupling pin that is configured with a locking surface that engages or disengages another locking surface to enable different valve lift modes. In the case of the SRFF, the coupling pin moves longitudinally within a bore of one lever to engage or disengage another lever. In many instances the coupling pin contains a flat locking surface that engages a corresponding flat locking surface. Flat locking surfaces are used because of their increased contact area and thus lower stresses and resultant wear, as compared to other shaped interfaces. However, alignment of the flat locking surface of the locking pin with the corresponding flat locking surface is required to enable locking functionality. Therefore, a solution is needed to provide alignment or anti-rotation of the locking pin, such that its flat locking surface maintains alignment with a corresponding flat locking surface. Additionally, a solution is needed that can be applied to different known SRFF designs that facilitate valve deactivation, cam profile switching, or a combination of the two, with a compact arrangement.

SUMMARY

A coupling pin anti-rotation arrangement for multiple example embodiments of a SRFF, capable of switching between two or more valve lift modes of operation, is provided. In a first example embodiment, the SRFF is capable of switching between a full valve lift mode and a no valve lift mode. In a second example embodiment, the SRFF is capable of switching between a high valve lift mode and a low valve lift mode. Both example embodiments comprise of an outer lever that has two arms that extend along longitudinal sides of an inner lever. The inner lever has a cavity in the center to house a roller, mounted by a transverse axle, which serves as a camshaft interface. The inner and outer levers are pivotably connected at one end, and lockably connected at an opposite end. When the inner lever is locked to the outer lever via a coupling pin located on one of the inner or outer levers, a first, locked position is achieved, defining a first valve lift mode. When the coupling pin is longitudinally actuated within a coupling pin bore such that the inner lever is unlocked from the outer lever, a second, unlocked position is achieved, defining a second valve lift mode. During the second valve lift mode, at least one lost motion spring provides a force that acts upon one of the inner or outer lever during its arcuate movement relative to the other lever. The coupling pin contains a longitudinal coupling projection with a first locking surface in the form of a flat, located on the other of the inner or outer levers, to engage a second locking surface in the form of a flat upon actuation of the coupling pin within the coupling pin bore. To maintain alignment of the first and second locking surfaces, at least one coupling pin-side anti-rotation flat is applied to the longitudinal coupling projection of the coupling pin. The at least one coupling pin-side anti-rotation flat is slidably guided by at least one lever-side anti-rotation flat, located on the lever with the second locking surface, throughout its longitudinal movement within the coupling pin bore to ensure proper locking function. The lever-side anti-rotation flat can generally be in an L-shape and slidably guides the coupling pin-side anti-rotation flat in a lost motion direction and a coupling pin direction for the second, unlocked and first, locked positions, respectively. Various locations of the coupling pin bore and lever-side anti-rotation flats will now be described for the first and second example embodiments.

The first example embodiment of the SRFF that applies the disclosed arrangement for coupling pin anti-rotation comprises an outer lever that includes the coupling pin bore and an inner lever that houses the at least one lever-side anti-rotation flat. In a first, locked position, the first locking surface of the coupling pin is engaged with the second locking surface of the inner lever. In this first, locked position, the inner lever and outer lever rotate in unison about a hydraulic pivot element, resulting in a full valve lift mode. In a second, unlocked position, the first locking surface is disengaged with the second locking surface of the inner lever. In this second, unlocked position, the inner lever rotates independently of the outer lever, resulting in a no valve lift mode. The SRFF captured in the first example embodiment is typically utilized to facilitate engine valve deactivation.

The second example embodiment of the SRFF that applies the disclosed arrangement for coupling pin anti-rotation comprises an inner lever that houses the coupling pin bore and an outer lever that houses the at least one lever-side anti-rotation flat. In this example embodiment, the outer lever comprises at least one slider pad or roller to interface with at least one camshaft lobe. In a first, locked position, the first locking surface of the coupling pin is engaged with the second locking surface of the outer lever, resulting in a first valve lift mode. In a second, unlocked position, the first locking surface is disengaged with the second locking surface of the outer lever, resulting in a second valve lift mode. Both the first and second valve lift modes typically achieve different valve lifts that are greater than zero. The SRFF captured in the second example embodiment is typically utilized to facilitate cam profile switching.

Additional aspects of the disclosure that can be used alone or in various combinations are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE EXAMPLE EMBODIMENTS

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivatives thereof, and words of similar import.

Figure 1:
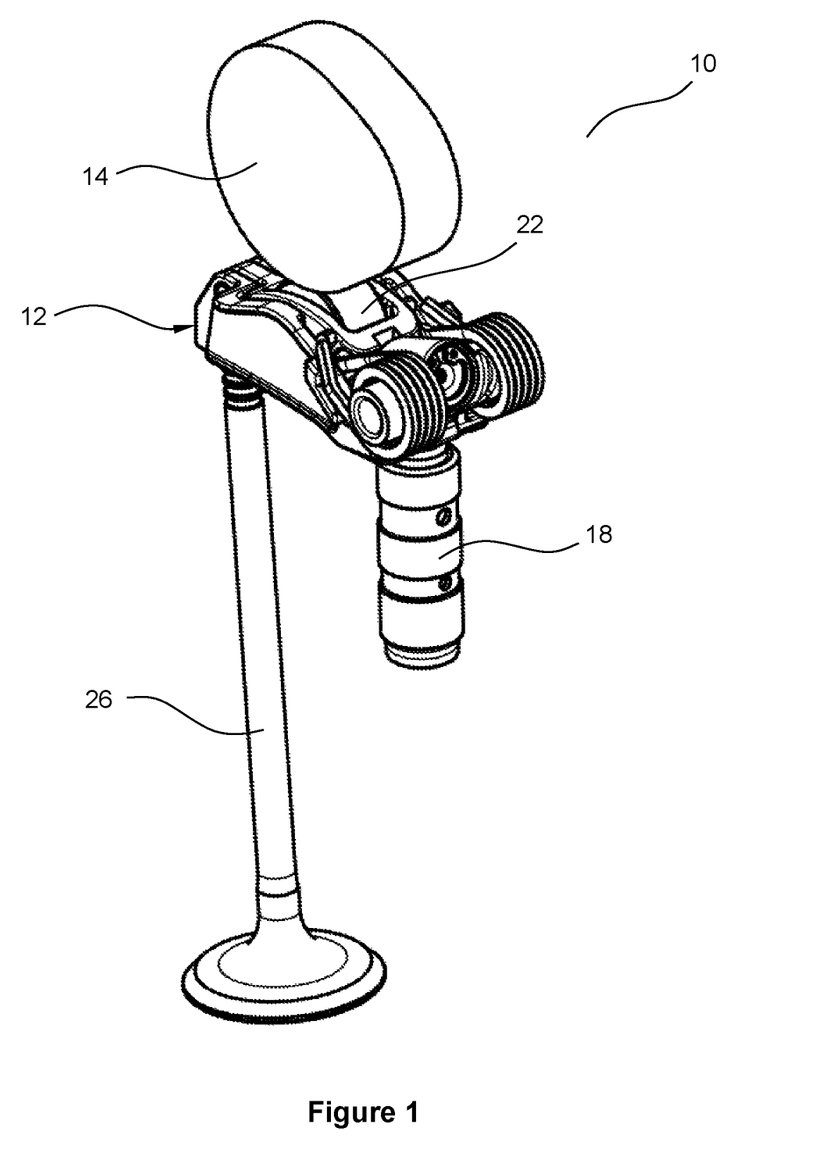
FIG. 1 is a perspective view of a SRFF within a valve train system according to a first example embodiment of the disclosure with no valve lift and full valve lift modes of operation.

Referring to FIG. 1, a perspective view of a SRFF 12 is shown within a valve train system 10 of an IC engine that includes a camshaft 14, an engine valve 26 and a hydraulic pivot element 18. The camshaft 14 rotationally actuates the SRFF 12 through a roller 22 interface about the hydraulic pivot element 18, causing rotational lift provided by the camshaft 14 to be translated to linear valve lift. The SRFF 12 shown in FIG. 1 captures a first example embodiment of a coupling pin anti-rotation arrangement, which will be described in detail with reference to FIGS. 2A through 6B.

Figure 2A:
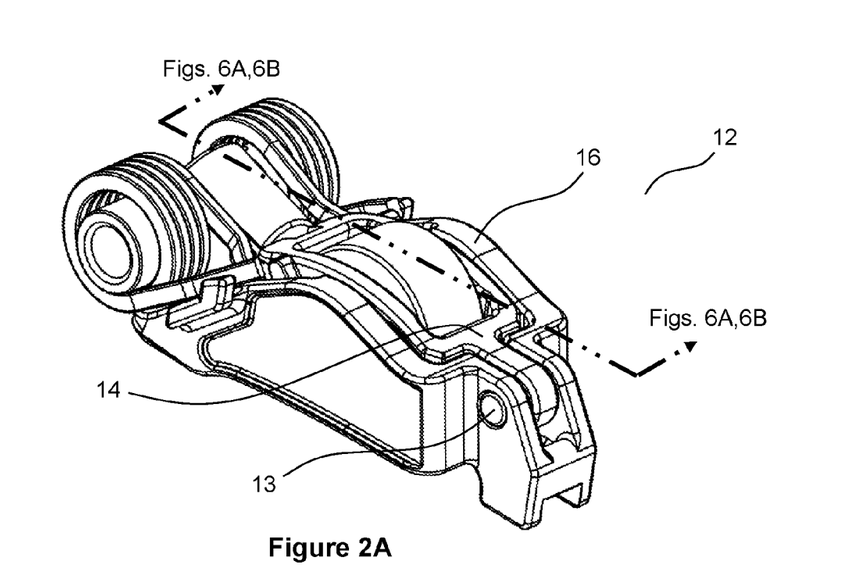
FIGS. 2A and 2B are perspective views of the SRFF of the valve train system of FIG. 1.
Figure 2B:
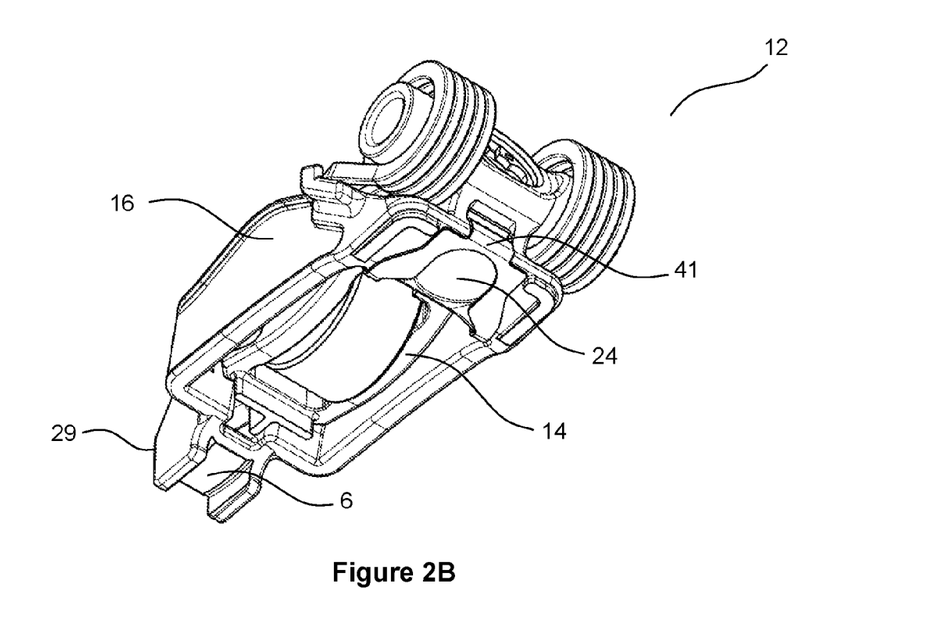

FIGS. 2A and 2B show top-side and bottom-side perspective views of the SRFF 12, respectively. The SRFF 12 is comprised of an outer lever 16 attached to an inner lever 14 by pivot axle 13. The outer lever 16 is configured with a valve interface 6 at a third end 29 and a hydraulic pivot element interface 24 at a fourth end 41.

Referring now to FIGS. 3A to 6B, a detailed explanation of the design and function now follows for the SRFF 12 captured in FIGS. 1 through 2B. With specific reference to FIGS. 3A through 4B, the inner lever 14 is configured with a first pivot aperture 28 on a first end 11 and the outer lever 16 is configured with second and third pivot apertures 34A,34B on the third end 29. The pivot axle 13 shown in FIG. 2A is disposed within the first, second, and third pivot apertures 28,34A,34B to pivotably connect the inner lever 14 to the outer lever 16. The outer lever 16 has two outer arms 39A,39B that extend along longitudinal sides 15A,15B of the inner lever 14. A cavity 21 within the inner lever 14 houses the roller 22 that interfaces with the camshaft 14 shown in FIG. 1. The roller 22 is connected to the inner lever 14 via a transverse axle pin (not shown) disposed within two axle apertures 25A,25B of the inner lever 14. Lost motion resilient elements or springs 20A,20B are arranged on lost motion spring posts 19A,19B of the outer lever 16. Lost motion spring retainers 17A,17B ensure containment of the lost motion springs 20A,20B on their respective lost motion spring posts 19A,19B during operation. The lost motion springs 20A,20B are arranged to apply an upward force against lost motion spring landings 23A,23B located on the inner lever 14 to bias the roller 22 of the inner lever 14 to an upper-most position.

Figure 3A:
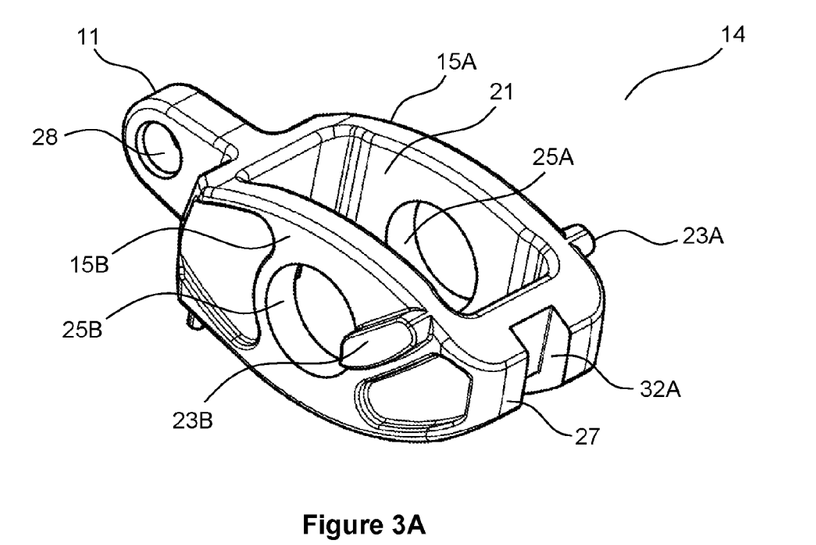
FIGS. 3A and 3B are perspective views of the inner lever of the SRFF of FIGS. 2A and 2B.
Figure 3B:
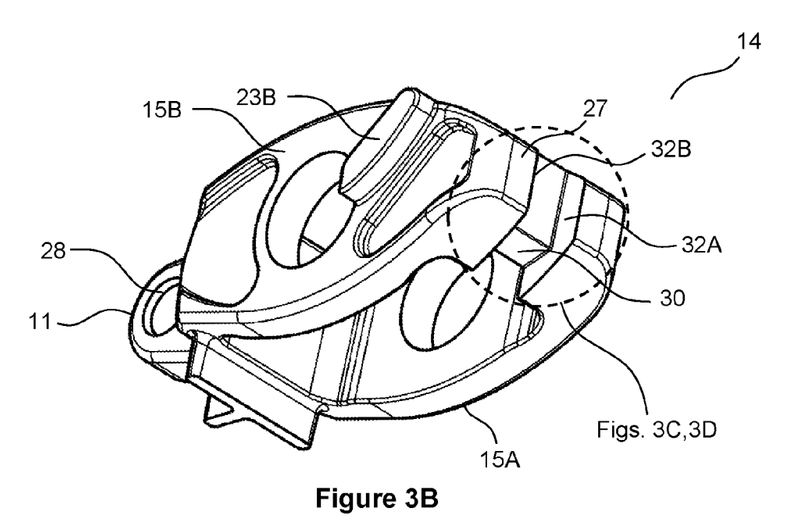
Figure 3C:
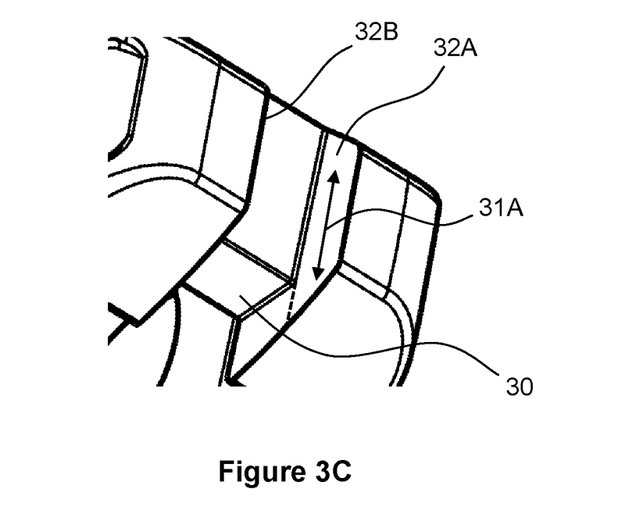
FIGS. 3C and 3D are detailed views taken from FIG. 3B.
Figure 4A:
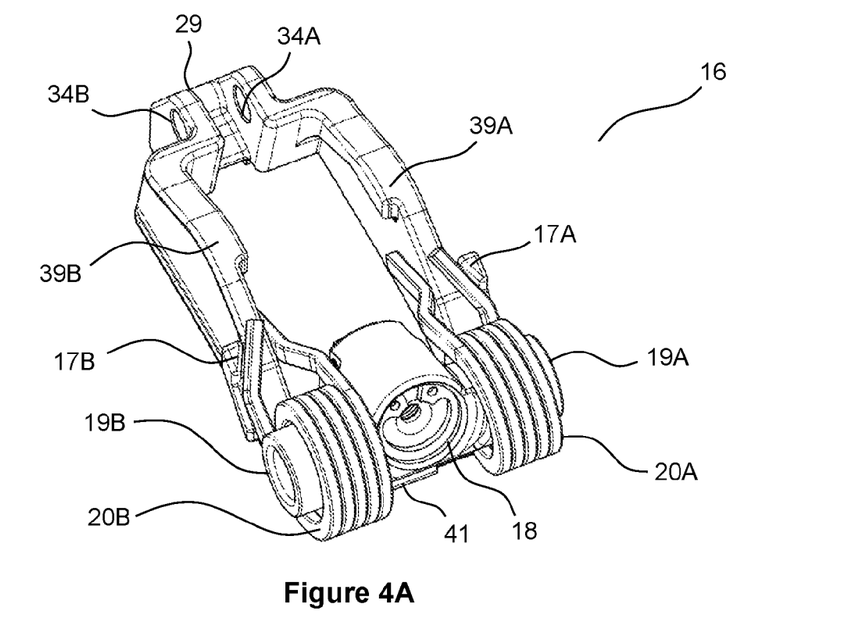
FIGS. 4A and 4B are perspective views of the outer lever of the SRFF of FIGS. 2A and 2B.
Figure 4B:
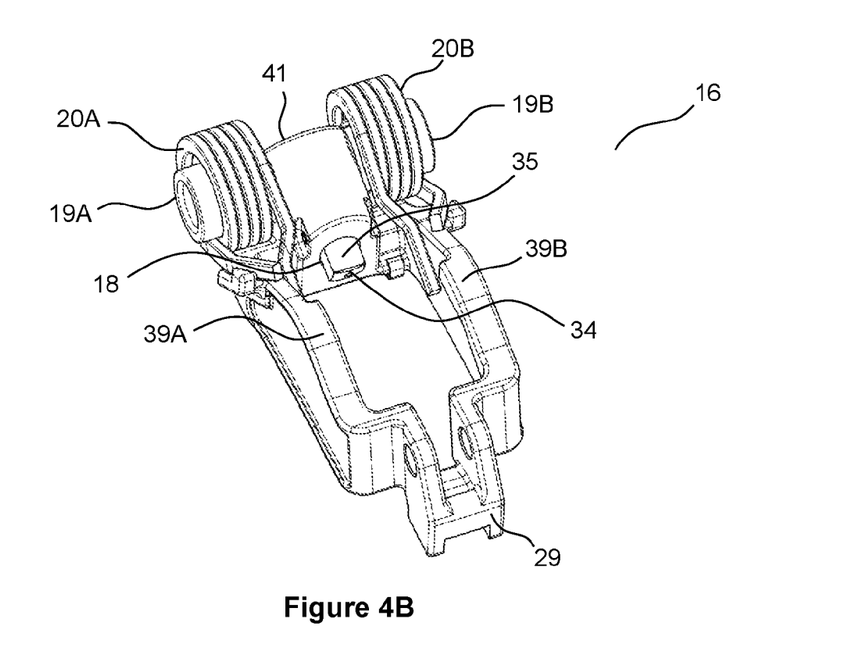

With reference to FIGS. 4A and 4B, a fourth end 41 of the outer lever 16 is configured with a coupling pin bore 18 that houses a coupling pin 34. Now referencing FIG. 5, the coupling pin 34 is shown that is configured with a coupling projection 36. The preferred material of the coupling pin 34 is steel, but other suitable materials are also possible. A first locking surface 35 is configured on the coupling projection 36 as a flat but can be of any suitable form for such a locking function. Adjacent to the first locking surface 35 is a first coupling pin-side anti-rotation flat 37A and, preferably, also a second coupling pin-side anti-rotation flat 37B. With reference to FIGS. 3A through 3C, a second locking surface 30 is shown on the second end 27 of the inner lever 14, which receives the first locking surface 35 of the coupling projection 36 of the coupling pin 34. The second locking surface 30 is also formed as a flat but can be of any suitable form for such a locking function. This position of the coupling pin 34 is shown in the cross-sectional view of FIG. 6A, defining a first locked position in which a coupling pin bias spring 38 is at a first compressed length L1. In this first locked position, the inner lever 14 and the outer lever 16 pivot in unison about the hydraulic pivot element 18 (reference FIG. 1), resulting in a full valve lift mode.

Figure 3D:
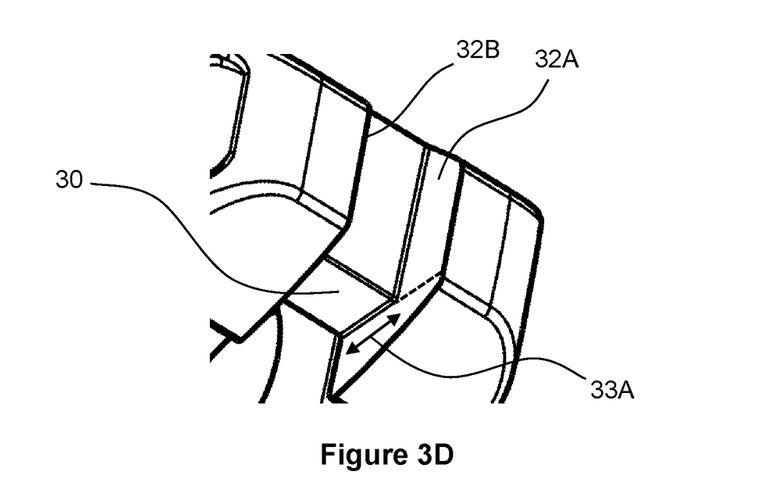
Figure 6A:
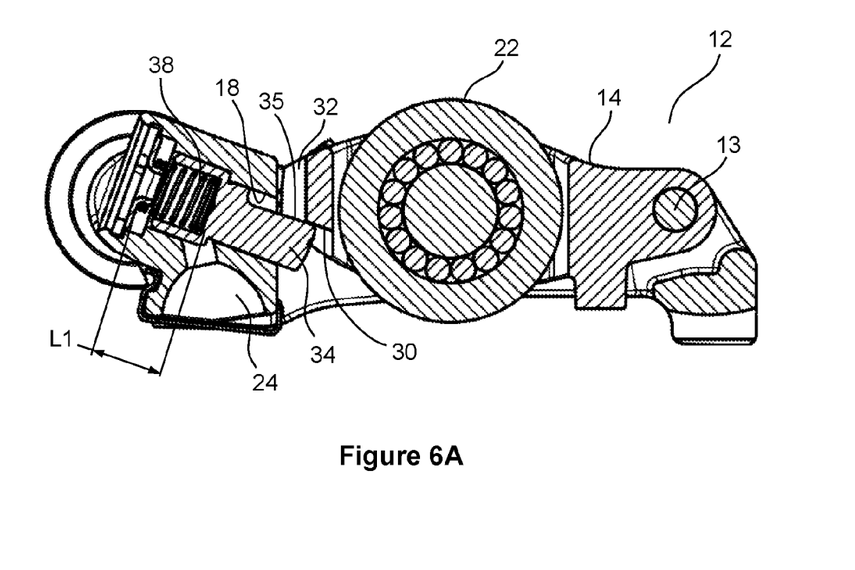
FIG. 6A is a cross-sectional view of the SRFF of FIGS. 2A and 2B in a locked position
Figure 6B:
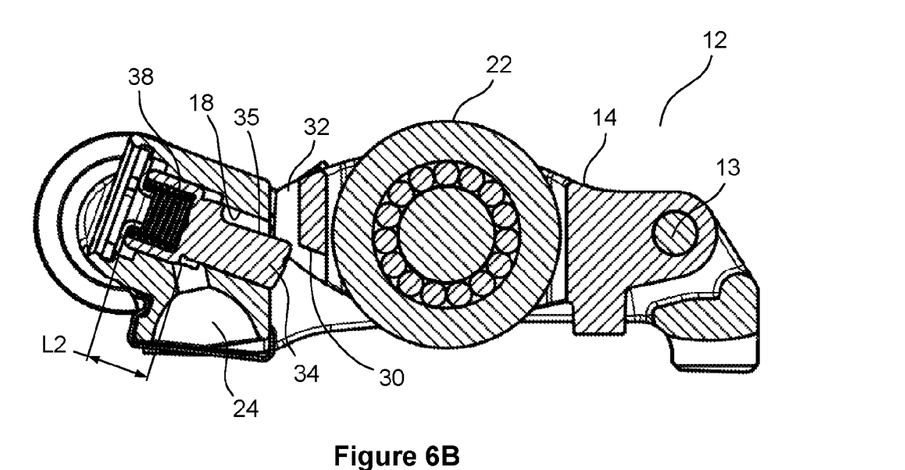
FIG. 6B is a cross-sectional view of the SRFF of FIGS. 2A and 2B in an unlocked position.

Now referencing FIG. 6B, the coupling pin 34 is longitudinally displaced within the coupling pin bore 18, defining a second unlocked position in which the coupling bias spring 38 is at a second compressed length L2. The second compressed length L2 of the second unlocked position is less than the first compressed length L1 of the first locked position. In this second unlocked position, the inner lever 14 is allowed to rotate about the pivot shaft 13 during each camshaft rotation, resulting in an arcuate motion of the inner lever 14, often termed lost motion or lost motion stroke. During the lost motion stroke it is necessary to prevent excessive rotation of the coupling pin 34 to ensure that the first locking surface 35 of the coupling pin projection 36 remains aligned with the second locking surface 30 of the inner lever 14. If this does not occur, the coupling pin 34 will not be displaceable to the first locked position, as only a small space or gap is present between the first and second locking surfaces 35,30. While this space can be of any size, it is preferably in the range of 0.010 to 0.300 mm. In accordance with such an anti-rotation requirement of the coupling pin 34, at least one, and preferably two lever-side anti-rotation flats 32A,32B slidably guide the coupling pin-side anti-rotation flats 37A,37B that are present on the coupling projection 36 of the coupling pin 34. To ensure that proper alignment of the first and second locking surfaces 35,30 is fulfilled, a small space or gap is present between the coupling pin-side anti-rotation flats 37A,37B and the lever-side anti-rotation flats 32A,32B. While this space can be of any size, it is preferably in the range of 0.010 to 0.500 mm. This space ensures a free, non-binding movement between the coupling pin 34 and lever-side anti-rotation flats 32A, 32B, during the lost motion stroke, however, any rotation of the locking pin 34 will be limited by this space. For this reason, contact between one of the lever-side anti-rotation flats 32A,32B and the corresponding coupling pin-side anti-rotation flat 37A,37B may occur over a portion or the entirety of the lever-side anti-rotation flat 32A,32B during the lost motion stroke. With reference to FIG. 3C, the shape of the anti-rotation flat 32A is generally L-shaped, but it can be any shape to fulfill its anti-rotation function. One can observe that while in the second unlocked position, the lever-side anti-rotation flat 32A serves to slidably guide the coupling-side anti-rotation flat 37A in a lost motion direction 31A, as shown in FIG. 3C; additionally, while in the first locked position, the anti-rotation flat 32A serves to slidably guide the coupling-side anti-rotation flat 37A in a coupling pin direction 33A, as shown in FIG. 3D. Furthermore, it is possible that only one coupling pin-side anti-rotation flat 37A and one corresponding lever-side anti-rotation flat 32A are required to facilitate the previously described anti-rotation function of the coupling pin 34.

Figure 5:
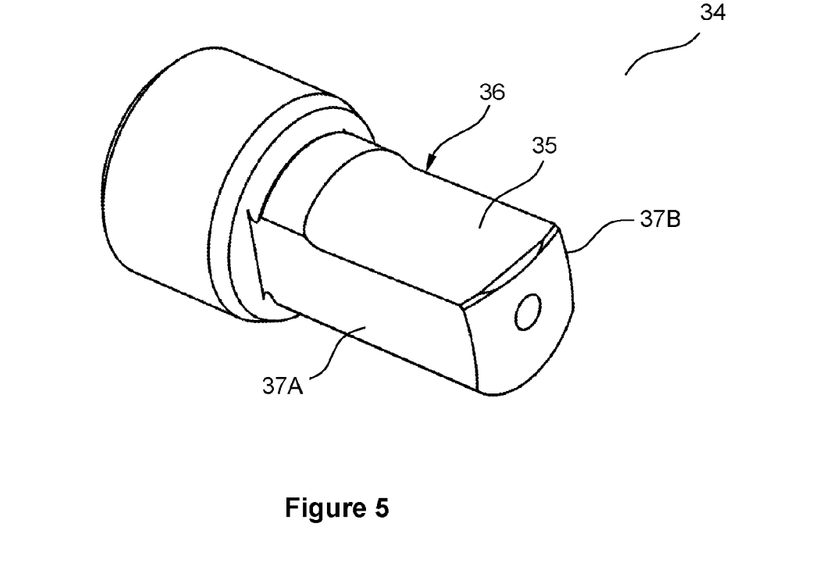
FIG. 5 is a perspective view of a coupling pin contained within the SRFF of FIGS. 2A, 2B, and 7A.
Figure 7A:
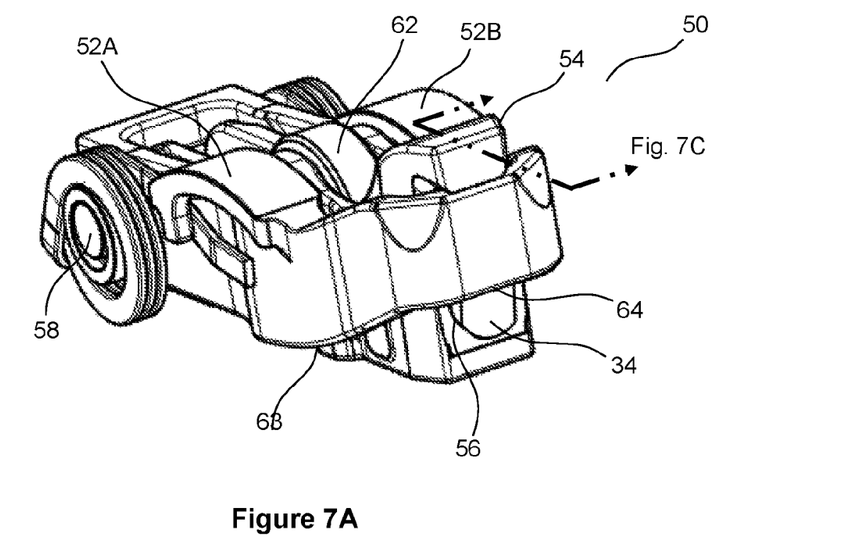
FIG. 7A is a perspective view of a second example embodiment of a SRFF providing high valve lift and low valve lift modes of operation.
Figure 7B:
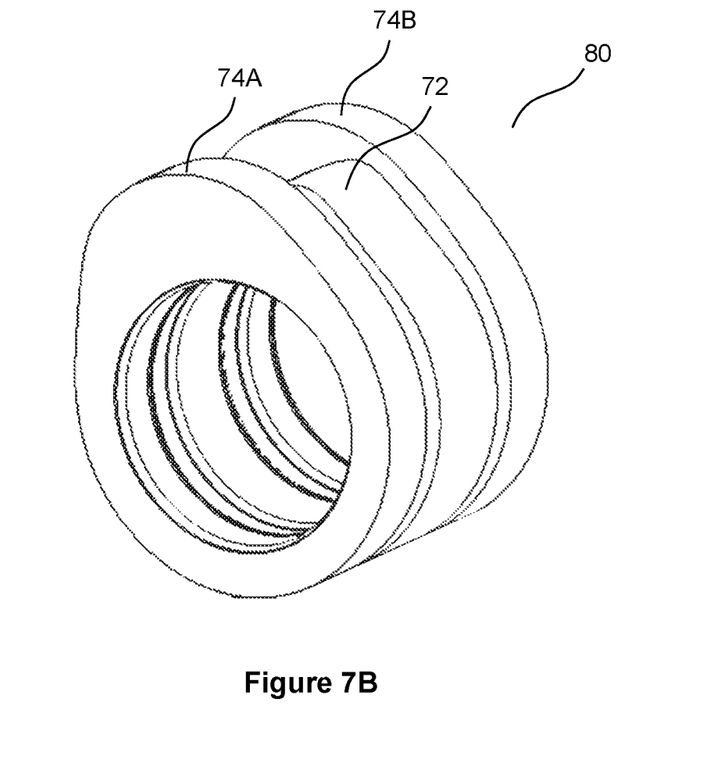
FIG. 7B is a perspective view of a tri-lobe camshaft for the SRFF shown in FIG. 7A.
Figure 7C:
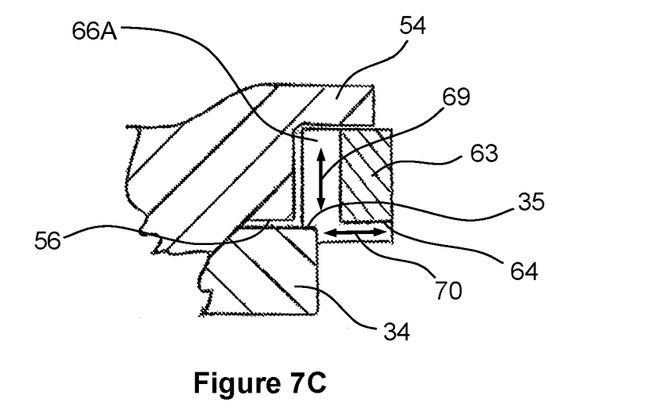

Referring now to FIGS. 7A through 7C, a SRFF 50 is shown that captures a second example embodiment of a coupling pin anti-rotation arrangement. The SRFF 50 includes an outer lever 63 pivotably attached to an inner lever 54 via pivot shaft 58. The inner lever 54 is configured with a roller 62 to interface with a first low-lift camshaft lobe 72 of a tri-lobe camshaft configuration 80. The outer lever is configured with two high lift slider pads 52A,52B that interface with second and third high-lift camshaft lobes 74A,74B of a tri-lobe camshaft configuration 80. The inner lever 54 is configured with a coupling pin bore 56 that houses the coupling pin 34 of the first example embodiment with the first locking surface 35 and adjacent coupling-side anti-rotation flats 37A,37B, as shown in FIG. 5. The coupling pin 34 moves longitudinally within the coupling pin bore 56 of the inner lever 54 to engage and disengage a second locking surface 64 located on the outer lever 63. Anti-rotation of the coupling pin 34 is achieved by the coupling pin-side anti-rotation flats 37A,37B being slidably guided by at least a first lever-side anti-rotation flat 66A and preferably also a second lever-side anti-rotation flat 66B (not shown). The shape of the lever-side anti-rotation flat 66A is generally L-shaped, but can be any suitable shape to fulfill its anti-rotation function. As with the first example embodiment, the lever-side anti-rotation flat 66A slidably guides the coupling pin-side anti-rotation flat 37A in a lost motion direction 69 while in the second unlocked position; and, the lever-side anti-rotation flat 66A slidably guides the coupling pin-side anti-rotation flat 37A in a coupling pin direction 70 while in the first locked position. In the first locked position in which the outer lever 63 is locked to the inner lever 54, rotational motion of the second and third high lift camshaft lobes 74A,74B is translated to the engine valve 26. In the second unlocked position, in which the outer lever 63 is uncoupled from the inner lever 54, the outer lever 63 is allowed to rotate about the pivot shaft 58 with respect to the inner lever 54; therefore, only rotational motion of the first low lift camshaft lobe 72 is translated to the engine valve 26.

The second example embodiment shown in FIGS. 7A through 7C, depicts a SRFF with two high lift slider interfaces 52A,52B on the outer lever 63 and the low lift interface on the inner lever 54 in the form of the roller 62. It would also be possible to have the high lift interface on the inner lever 54 in the form of a single interface and the low lift interface on the outer lever 63, in the form of two interfaces.

Having thus described various example embodiments of the present arrangement in detail, it is to be appreciated and will be apparent to those skilled in the art that many physical changes, only a few of which are exemplified in the detailed description above, could be made in the apparatus without altering the inventive concepts and principles embodied therein. The present example embodiments are therefore to be considered in all respects as illustrative and not restrictive, the scope of the embodiments being indicated by the appended claims rather than by the foregoing description, and all changes which come within the meaning and range of equivalency of the claims are therefore to be embraced therein.

What is claimed is:

1. A switchable roller finger follower comprising:
an inner lever having first and second ends;
an outer lever having:
two outer arms that extend along longitudinal sides of the inner lever; and,
a third end mounted for pivoting movement at the first end of the inner lever by a pivot axle;
a coupling pin arranged to move longitudinally within a coupling pin bore located on one of the inner lever or the outer lever on an end opposite from the pivot axle, the coupling pin having:
a coupling projection with a first locking surface; and, at least one coupling pin-side anti-rotation flat; and,
the coupling pin is moveable from a first, locked position with the first locking surface engaged with a second locking surface located on the other of the inner lever or the outer lever, to a second, unlocked position where the first locking surface is not engaged with the second locking surface, and the at least one coupling pin-side anti-rotation flat is slidably guided by an at least one lever-side anti-rotation flat, located on the other of the inner lever or the outer lever.

2. The switchable roller finger follower of claim 1, wherein the at least one lever-side anti-rotation flat includes first and second lever-side anti-rotation flats and the at least one coupling pin-side anti-rotation flat includes first and second coupling pin-side anti-rotation flats.

3. The switchable roller finger follower of claim 1, wherein the at least one lever-side anti-rotation flat and the at least one coupling pin-side anti-rotation flat have a space defined therebetween that ranges from 0.010 to 0.500 mm.

4. The switchable roller finger follower of claim 1, wherein the first and second locking surfaces have a space defined therebetween that ranges from 0.010 to 0.300 mm.

5. The switchable roller finger follower of claim 1, wherein the first and second locking surfaces are formed as flats.

6. The switchable roller finger follower of claim 1, wherein the at least one lever-side anti-rotation flat is generally L-shaped.

7. The switchable roller finger follower of claim 1, wherein the at least one coupling pin-side anti-rotation flat is slidably guided by the at least one lever-side anti-rotation flat in the coupling pin direction while in the first locked position, and the at least one coupling pin-side anti-rotation flat is slidably guided by the at least one lever-side anti-rotation flat in the lost motion direction while in the second, unlocked position.

8. The switchable roller finger follower of claim 1, wherein the at least one lever-side anti-rotation flat remains in constant contact with the at least one coupling pin-side anti-rotation flat.

9. The switchable roller finger follower of claim 1, wherein the first, locked position defines a first valve lift mode and the second, unlocked position defines a second valve lift mode.

10. The switchable roller finger follower of claim 9, wherein the first valve lift mode is a full valve lift mode and the second valve lift mode is a no valve lift mode.

11. The switchable roller finger follower of claim 10, wherein the second locking surface and the at least one lever-side anti-rotation flat are located on the inner lever and the coupling pin bore is located on the outer lever.

12. The switchable roller finger follower of claim 1, further comprising a cam roller follower arranged on the inner lever.

13. The switchable roller finger follower of claim 1, further comprising a valve interface configured on the third end and a pivot interface configured on a fourth end of the outer lever.

14. The switchable roller finger follower of claim 9, wherein the first valve lift mode is a high valve lift mode and the second valve lift mode is a low valve lift mode.

15. The switchable roller finger follower of claim 14, wherein the second locking surface and the at least one lever-side anti-rotation flat are located on the outer lever and the coupling pin bore is located on the inner lever.

16. The switchable roller finger follower of claim 1, further comprising a resilient element in contact with the coupling pin, the resilient element having a first compressed length in the first locked position and a second compressed length in the second unlocked position, wherein the first compressed length is greater than the second compressed length.

17. The switchable roller finger follower of claim 1, further comprising at least one lost motion resilient element arranged between the inner lever and the outer lever.

\* \* \* \* \*